United States Patent [19]

Samonil et al.

[11] Patent Number: 5,372,224
[45] Date of Patent: Dec. 13, 1994

[54] OSCILLATION DAMPER

[75] Inventors: Otto Samonil, Niederwerrn; Wolfgang Zirk, Dittelbrunn, both of Germany

[73] Assignee: Fichtel & Sachs AG, Schweinfurt, Germany

[21] Appl. No.: 14,350

[22] Filed: Feb. 5, 1993

[30] Foreign Application Priority Data

Feb. 7, 1992 [DE] Germany ............... 4203508

[51] Int. Cl.5 ............... F16F 9/46; B60G 17/08
[52] U.S. Cl. ............... 188/319; 188/322.15
[58] Field of Search ............... 188/282, 299, 316, 319, 188/322.15

[56] References Cited

U.S. PATENT DOCUMENTS

| | | | |
|---|---|---|---|
| 3,113,644 | 12/1963 | Wossner | 188/322.15 |
| 3,829,538 | 8/1974 | Morgan | 188/319 |
| 4,726,453 | 2/1988 | Obstfelder et al. | 188/319 |

FOREIGN PATENT DOCUMENTS

| | | |
|---|---|---|
| 0122575 | 10/1984 | European Pat. Off. |
| 2503247 | 7/1976 | Germany . |
| 2723102 | 11/1978 | Germany ............... 188/282 |
| 8804084 | 7/1988 | Germany . |
| 2119473 | 11/1982 | United Kingdom . |
| 2187346 | 9/1987 | United Kingdom . |

OTHER PUBLICATIONS

Patent Abstracts of Japan, vol. 12, No. 321 (M-736) (3168) Aug. 31, 1988-JP-63 88 340, Apr. 19, 1988.

Primary Examiner—Robert J. Oberleitner
Assistant Examiner—Kevin D. Rutherford
Attorney, Agent, or Firm—Brumbaugh, Graves, Donohue & Raymond

[57] ABSTRACT

An oscillation damper is provided with a by-pass that includes a by-pass valve. The by-pass valve is switchable between an open position and a closed position. When the by-pass valve is moved between the open and closed positions, the rate of change of the cross-sectional area of the by-pass valve during the time when the by-pass valve is adjacent the closed position is considerably less than the average rate of change of the cross-sectional area during the entire time that it takes for the by-pass valve to switch between the open and closed positions.

30 Claims, 8 Drawing Sheets

OSCILLATION DAMPER

BACKGROUND OF THE INVENTION

In an oscillation damper, particularly in an oscillation damper of a motor car, a piston unit separates two working chambers from each other. A damping valve unit extends across said piston unit. The piston unit is axially movable together with a piston rod member with respect to a cylinder member accommodating the piston unit within a cavitiy. The damping characteristic depends not only on the construction of the damping valve unit but also on the volume of fluid which is urged through the damping valve unit per time unit. The volume of damping fluid to be urged through the damping valve unit per time unit can be varied by a by-pass channel arranged substantially parallel with respect to the damping valve unit. The by-pass channel contains a by-pass valve unit. The by-pass valve unit can be switched between an open position and a closed position. In the closed position a maximum flow of damping fluid occurs through the damping valve unit and the damping action of the oscillation damper is at a maximum damping force. In the open condition of the by-pass valve unit a considerable part of the damping fluid can flow through the by-pass channel. So the damping action is at a minimum damping force. The switching between the closed condition and the open condition of the by-pass valve unit requires a finite transition time or switch time. During this switch time the cross-sectional area of the by-pass valve unit is varied.

STATEMENT OF THE PRIOR ART

From German utility model publication 88 04 084 a shock absorber is known which has at least a three stage damping power adjustment by means of a by-pass channel system. The piston rod member is provided with two damping pistons one behind the other in the axial direction of the piston rod member. The piston rod member is partially hollow. A first by-pass valve unit can open or close a passage between the hollow space of the piston rod member and the cavity of the cylinder member at a location allocated to a first working chamber. A second valve unit is available for opening or closing a passage between the hollow space of the piston rod member and a second working chamber. A third passage which is always open connects the hollow space of the piston rod with an intermediate chamber between the two damping pistons. By closing both by-pass valve units a damping stage of maximum damping force is obtained because none of the damping valves is by-passed. In a second damping stage the damping valve of a first damping piston is by-passed whereas the damping valve unit of the second damping piston is not by-passed. In a third damping stage of minimum damping force the damping valve units of both damping pistons are by-passed. A fourth damping stage is possible, if the damping valve units of the two damping pistons are different. In this case one can selectively by-pass either the one damping piston or the other. The opening and closing of the by-pass valve units is effected by a rotation of respective rotary sleeves that are in contact with respective sections of an inner bore of a part of the piston rod member. The rotary sleeve and the respective part of the hollow piston rod member are provided with substantially radial openings which are switchable between an overlapping condition (open condition) and a non-overlapping condition (closed condition). When approaching the closed condition, noises occur. This is particularly true when a high switching speed is required. These noises probably result from peaks of pressure and the rate of pressure changes.

During travel even an insensitive driver can hear these undesirable noises when the rotary sleeve is brought from its opening position to its closing position by a computer-controlled actuating unit.

OBJECT OF THE INVENTION

It is an object of the present invention to eliminate noises occurring as a result of the switching of a by-pass valve unit between a by-pass opening position and a by-pass closing position even with short switching periods. It is a further object of the present invention to eliminate the noises in a simple way.

The invention is particularly applicable to shock absorbers in which the by-pass valve units comprise rotary slide valves.

SUMMARY OF THE INVENTION

An oscillation damper comprises at least two damper units moveable with respect to each other. These units are, for example, a cylinder member and a piston rod member of the oscillation damper. At least two working chambers are provided within this oscillation damper. At least one damping valve unit is provided between the two working chambers. A damping fluid, and particularly a damping liquid is contained within the working chambers. The damping fluid is damplingly urged through the damping valve unit in response to relative movement of the damper units with respect to each other. At least one by-pass channel system is provided. This by-pass channel system has at least one by-pass valve unit. The by-pass valve unit has a by-pass cross-sectional area, which is variable between an open value and a closing value. The respective values of the by-pass cross-sectional area have an influence on the damping behaviour of the oscillation damper. The cross-sectional area of the by-pass valve unit is variable by an actuating device moving said two valve members with respect to each other through movement transmission means at a relative movement speed. The valve members confine the by-pass cross-sectional area. A transition time period $\Delta T$ is necessary for the relative movement of the valve members between an open value relative position, providing the open value $A_o$ of said by-pass cross-sectional area a and a closing value relative position providing the closing value $A_c$ of the by-pass cross-sectional area a. The relative movement speed of the actuating unit, the transmission ratio of the movement transmission means and shaped parts of the valve members define a cross-sectional area change function $da/dt$, which is dependent on a transition time progress t during the transition time period $\Delta T$. The respective value of the cross-sectional area change function $da/dt$ is variable in dependence of time progress t and is, when the valve members are close to the closing value relative position, considerably smaller than the quotient $$\frac{A_o - A_c}{\Delta T}.$$

$A_o - A_c$ represents the total variation of the cross-sectional area a during the transition time period $\Delta T$. Thus, the quotient $$\frac{A_o - A_c}{\Delta T}$$

represents the average cross-sectional area change per time unit when the valve members are moved from the open value relative position to the closing value relative position. It has been found that the noise which has occurred up to now could be considerably reduced or even eliminated. The required short transition time $\Delta T$ which is necessary in operation of the oscillation damper can be maintained. Whereas in the past it has sometimes been necessary to switch the by-pass valve unit only when specific conditions are fulfilled, for example, only when certain flow rates of the damping fluid exist, the present invention helps to allow switching at any time during operation of the oscillation damper.

For giving certain numerical values, the cross-sectional area change function da/dt may—within a time interval of 20% of the transition time period $\Delta T$ adjacent the time where the closed cross-sectional area is reached—be less than 50%, preferably less than 30%, and still more preferably, less than 20% of the average cross-sectional area change per time unit during the total transition time period $\Delta T$.

It is not excluded that the cross-sectional area change function da/dt is different during a closing operation on the one hand and an opening operation on the other hand. Preferably, however, the cross-sectional area change function da/dt is the same for both directions of relative movement of the valve members, i.e., the respective values of the cross-sectional area change function da/dt are identical in any relative position of the valve members spaced from the open value relative position by a predetermined time interval irrespective of the direction of the relative movement.

The value of the cross-sectional area change function da/dt may be—within a time interval adjacent the closed value relative position, which time interval is smaller than 20% of the transition time period,—smaller than 50% of the value of the function da/dt adjacent the open value relative position of the valve members, preferably smaller than 30% and most preferably smaller than 20%.

Moreover, the value of the cross-sectional area change function da/dt may be—within a time interval adjacent the closed value relative position, which time interval is smaller than 10% of the transition time period,—smaller than 30% and preferably smaller than 20% of the value of said function da/dt adjacent the open value relative position of the valve members.

The cross-sectional area change function da/dt may, for example, be substantially a linear function, or substantially a parabolic function or substantially a hyperbolic function. According to a most preferred embodiment the cross-sectional area change function da/dt is substantially a hyperbolic function within a first time interval of the transition time period and is a substantially parabolic function within a second time interval of the transition time period. The first time interval is in this case adjacent the open value relative position and the second time interval is adjacent the closed value relative position. The first time interval is longer than the second time interval.

The variation of the cross-sectional area change function da/dt may be substantially a result of a variation of the driving speed of the actuating device in response to a progress of transition time.

Alternatively, the variation of the cross-sectional area change function da/dt may also be substantially a result of a variation of the transmission ratio of the movement transmission means in response to a progress of transition time. In this case, the driving speed of the actuating device may be constant. A variable transmission ratio can be easily obtained by well known non-linear transmission gear means, such as cam—cam follower gear means or crank drive gear means. In such an embodiment one can use an actuating mechanism providing a constant driving speed. It is to be noted, however, that it is also easily possible, to provide actuating devices such as electric motors, which can be driven with a variable r.p.m. in using an easily available electric control unit for this motor.

According to a most preferred and most simple embodiment the variation of the cross-sectional area change function da/dt is substantially a result of the shape of at least one of the valve members. In this case, both the driving speed of the actuating device and the transmission ratio of the movement transmission means may be substantially constant during the transition time period.

The valve members may have respective contact surfaces in surface contact with each other and each of the valve members may be provided with at least one respective opening therethrough. In this case the valve members are made movable with respect to each other in a direction along a line of relative movement following the contact surfaces. The openings are brought into an overlapping condition in the open value relative position of the valve members and are brought in an overlapping free condition in the closed value relative position of the valve members.

As a general rule for obtaining a variable cross-sectional area change function da/dt one can say that the openings—when regarded in a direction substantially perpendicular to the contact surfaces in the open value relative position—should have their respective centres of gravity spaced from each other along the line of relative movement.

If the by-pass cross-sectional area is in the overlapping condition of two openings confined by at least two edge lines, namely a first edge line of an opening of a first one of the valve members and a second edge line of an opening of a second one of the valve members, these first and second edge lines may be movable with respect to each other along the line of relative movement. In such case one can obtain a hyperbolic cross-sectional area change function in that one of said first and second edge lines is a substantially straight line substantially perpendicular to the line of relative movement and the other one of said first and second lines is a substantially hyperbolic line. One can combine two substantially hyperbolic lines with one straight line such that the cross-sectional area adopts a T-shape of the variable cross-sectional area.

It is also possible that one of the first and the second edge lines is a substantially straight line perpendicular to the line of relative movement, whereas the other one of the first and the second line is a substantially parabolic line. In this case one obtains a parabolic cross-sectional area change function da/dt.

Further it is possible that one of the first and the second edge lines is a substantially straight line substantially perpendicular to the line of relative movement, whereas the other one of said first and second edge line is again a substantially straight line, but defining an angle less than 90° with the line of relative movement. In this case one can obtain a linear cross-sectional area change function da/dt.

While the cross-sectional area change function da/dt is preferably a steady function such as a hyperbolic function or a parabolic function or a steady linear function, it is possible also to apply non-steady functions. Thus it is possible that one of the first and the second edge lines is a substantially straight line, substantially perpendicular to the line of relative movement, whereas the other one of the first and second edge lines is a stepped line.

It is also possible that one of the valve members comprises a plurality of openings within a field extending both in the direction of said line of relative movement and in the direction transverse of said line of relative movement. If in such case the number of openings along transverse lines transverse to said line of relative movement is varied along said line of relative movement, one can obtain a great variety of cross-sectional area change functions.

The valve members may be switched between the open value relative position and the closed value relative position by rotation with respect to each other. For example, one of the valve members may be a tube stationary with respect to a piston rod unit of the oscillation damper and the other one of the valve members may be a sleeve member, rotatable with respect to said tube member within an inner bore thereof. Both, the sleeve member and the tube member, may be provided with radial openings which define the by-pass cross-sectional area in cooperation. In this case the line of relative movement extends along a circle, contained in a cylindrical contact surface of the tube member and the sleeve member.

According to a very simple and easily operable embodiment, two piston units are provided on a piston rod unit in an axially spaced relationship along the piston rod unit. The piston units are housed within a cavity of a cylinder member and are slidable along an inner surface of the cylinder member. Each of the piston units comprises at least one damping valve unit and preferably at least two damping valve units for opposite directions of fluid flow. These damping valve units may be directed substantially in axial direction. The by-pass system comprises an axial channel within the piston rod unit. At least two by-pass valve units are provided. One of the by-pass valve units connects the axial channel with a first working chamber and a second by-pass valve unit connects the axial channel with a second working chamber. A third passage connects the axial channel with an intermediate chamber between the piston units. This third passage is always open. Such one can obtain three or even four different damping characteristics by either opening both by-pass valve units (soft damping characteristic) or closing both by-pass valve units (hard damping characteristic) or closing one of the two by-pass valve units and opening the other one of said by-pass valve units (middle hard damping characteristic).

While it is not to be excluded that certain intermediate values of the by-pass cross-sectional area are selectable for operation of the oscillation damper, the invention is most preferably applied to oscillation dampers, in which the respective by-pass valve cross-sectional area can be switched only between an open value and a zero value.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter, in which there are illustrated and described preferred embodiments of the invention.

BRIEF DESCRIPTION OF THE DRAWINGS

The invention will be explained in greater detail hereinafter with reference to embodiments shown in the accompanying drawings in which.

DETAILED DESCRIPTION OF THE PREFERRED EMBODIMENTS

Figure 1:
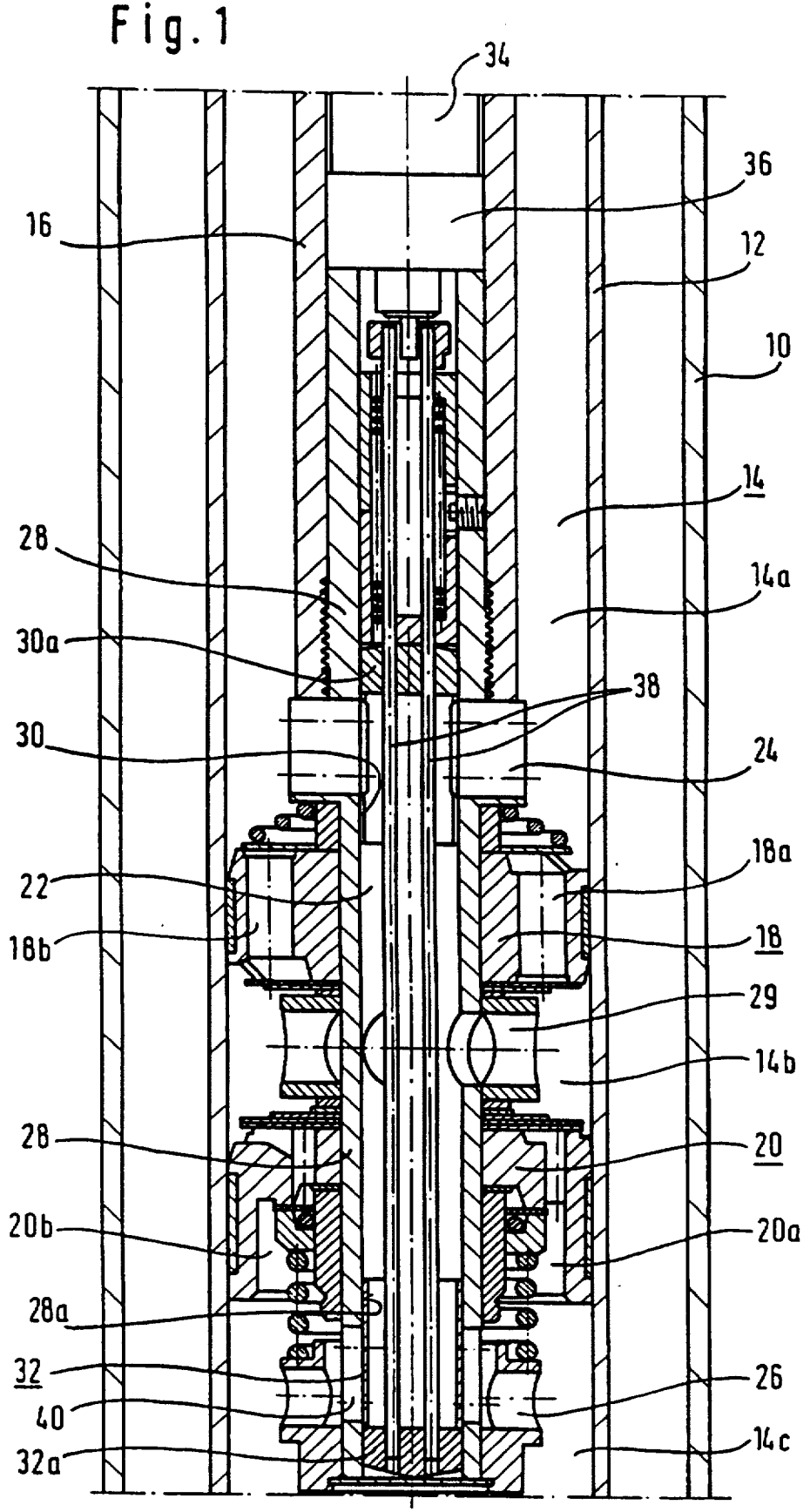
FIG. 1 shows an overall illustration of an oscillation damper with variable damping force.

In FIG. 1 there is shown a partial sectional view of a double tube oscillation damper or shock absorber. This oscillation damper comprises a container 10 and within this container 10 a cylinder 12. A cavity 14 is confined within the cylinder 12. A piston rod 16 is introduced into the cylinder 12 from the upper end thereof through an upper end wall (not shown). The piston rod 16 is provided with a first damping piston unit 18 and a second damping piston unit 20. The upper piston unit 18 is provided with two damping valve units 18a and 18b. The damping valve unit 18a opens on upward movement of the piston rod 16, when the damping liquid within the upper working chamber 14a is compressed; the damping valve unit 18b opens on downward movement of the piston rod 16, when an increased pressure occurs within the intermediate working chamber 14b. In an analogous way the lower piston unit 20 is provided with damping valve units 20a and 20b. A central by-pass channel extends axially within the lower portion of the piston rod 16. This by-pass channel is designated by 22. Both piston units 18 and 20 can be by-passed by the by-pass channel 22. There is provided a first by-pass valve unit 24 between the upper working chamber 14a and the by-pass channel 22 at the upper end of the damping piston unit 18 and there is provided a second by-pass valve unit 26 between the by-pass channel 22 and the working chamber 14c at the lower end of the lower damping piston unit 20. There is further a continuously open passage 29 connecting the by-pass channel 22 with the intermediate working chamber 14b. If both the upper by-pass valve unit 24 and the lower by-pass valve unit 26 are open, the damping valve units of both damping piston units 18 and 20 are by-passed and the damping characteristic is at a minimum damping force. When both by-pass valve units 24 und 26 are closed the damping valves of none of the two damping piston units are by-passed. Therefore the damping valves of the two damping piston units 18,20 are in series. As a result thereof the damping characteristic of the oscillation damper is at a maximum damping force. If the upper by-pass valve unit 24 is closed and the lower by-pass valve unit 26 is open, only the damping valves of the lower piston unit 20 are by-passed so that one has a damping characteristic with an intermediate damping force resulting substantially from the damping forces provided by the damping valves in the upper piston unit 18. When the lower by-pass valve unit 26 is closed and the upper by-pass valve unit 24 is open, then only the damping valves of the upper piston unit 18 are by-passed and there is again obtained a damping characteristic with an intermediate damping force. As the damping valves of the lower and the upper piston units 20 and 18 may be different, it is possible to obtain four different damping characteristics by actuation of the two by-pass valve units 24 and 26.

The upper by-pass valve unit 24 comprises a tube member 28 which is stationary with respect to the piston rod member 16 and a sleeve member 30 which is rotatable with respect to the tube member 28. Both, the tube member 28 and the sleeve member 30, are provided with radial openings which may be either brought to a maximum overlapping condition corresponding to an open condition of the by-pass valve unit 24 or to a non-overlapping condition corresponding to a closed condition of the by-pass valve unit 24. The same is true for the lower by-pass valve unit 26 which comprises again the tube 28 and a further sleeve member 32. The sleeve members 30 and 32 are rotatable by an electric motor 34 through transmission means 36 which may comprise gear means of variable transmission ratio. The sleeve members 30 and 32 are driven from the transmission means 36 through a pair of driving rods 38 which extend through end plates 32a and 30a of the sleeve members 32 and 30 respectively.

Figure 2:
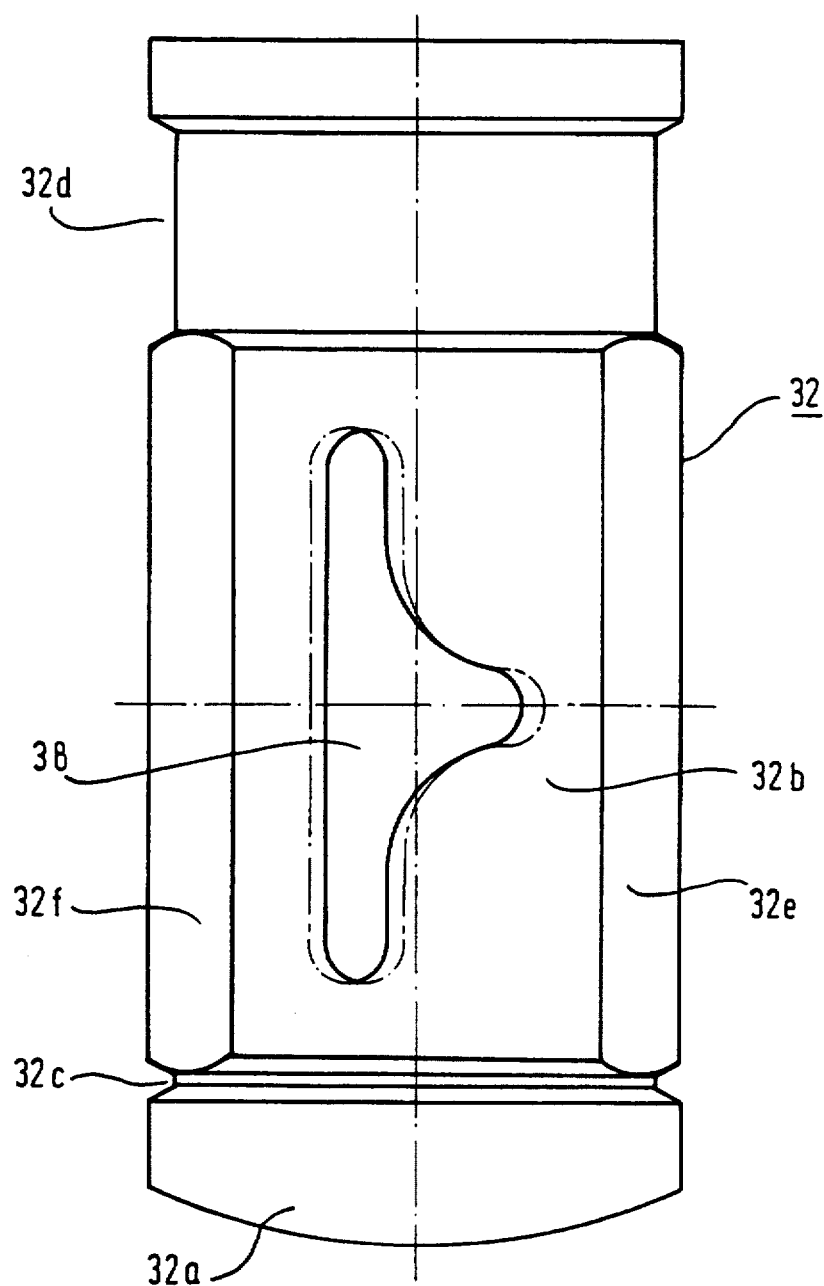
FIG. 2 shows a detail of FIG. 1, namely a rotatable valve member.

The lower sleeve member 32 is shown in more detail in FIG. 2. The upper sleeve member 30 is designed according to analogous principles. The lower sleeve member 32 has a circumferential contact surface 32b, which is in substantially sealing contact with an internal circumferential and cylindrical contact face 28a of the tube member 28.

In FIG. 2 one recognizes an opening 38 within the sleeve member 32. This opening 38 can be brought by the electric motor 34 in or out of an overlapping condition with an opening 40 of the tube member 28. The sleeve member 32 has its contact face 32b in substantially sealing contact with the contact face 28a of the tube member 28. Near the upper end and near the lower end of the sleeve member 32 there are provided circular grooves 32c and 32d, which are interconnected by axial grooves 32e und 32f. These circular grooves and axial grooves 32c-32f are responsible for pressure balance in order to prevent a clamping of the sleeve member 32 within the tube member 28.

Figure 11A:
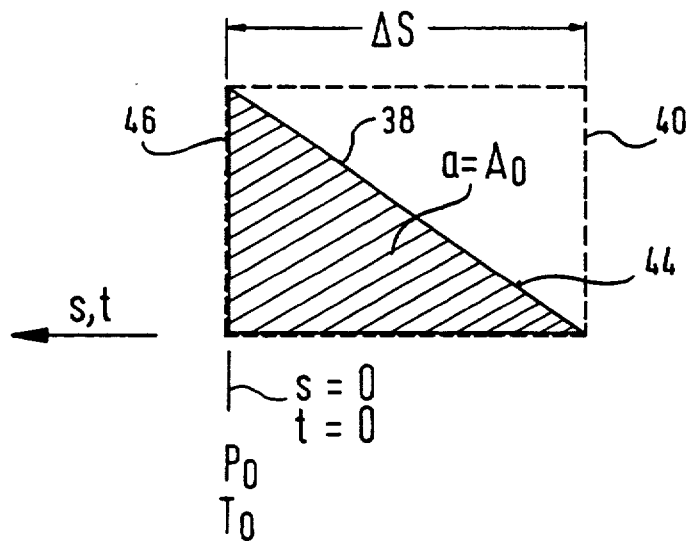
FIGS. 11a-11c show in a diagrammatic way the change of the cross-sectional area of the by-pass valve unit in dependence of time progress.
Figure 11B:
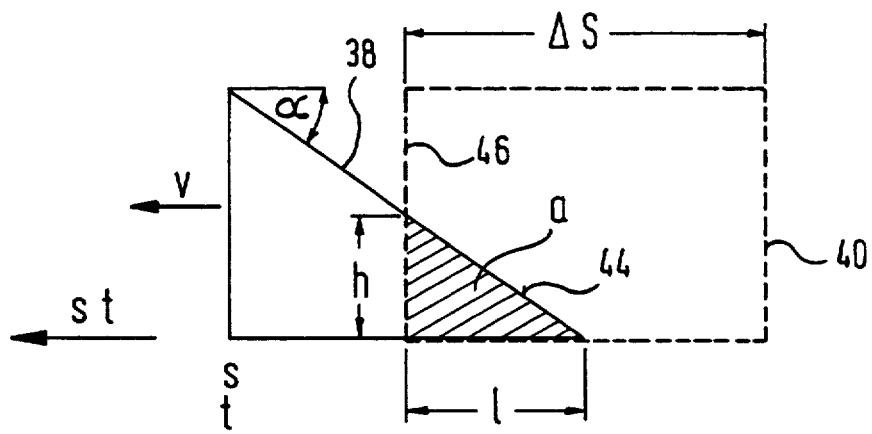
Figure 11C:
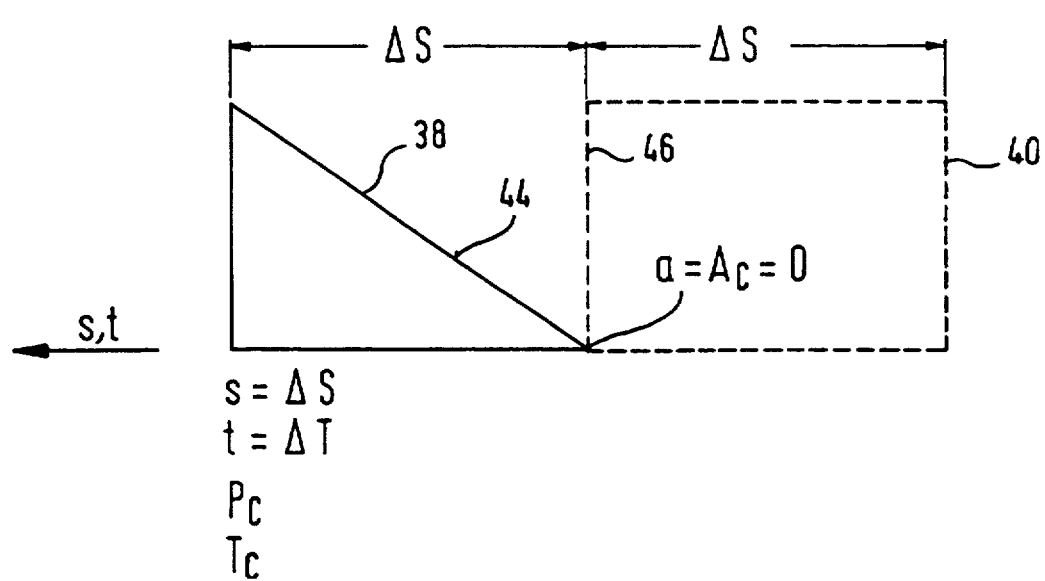

FIGS. 11a to 11c are intended for the explanation of the principle of the present invention. In FIGS. 11a to 11c the opening 38 of FIG. 2 is for simplicity reasons shown as a triangle 38 which is surrounded by full lines. An opening 40 of the tube member 28 of FIG. 1 is in FIGS. 11a to 11c shown for simplicity reasons as a rectangular opening which is surrounded by dotted lines. The opening 38 is movable with respect to the opening 40 in leftward direction from the open position $P_o$ of FIG. 11a to the closed position $P_c$ of FIG. 11c. FIG. 11a represents the starting condition of the leftward movement with the movement path s of the opening 38 being zero and the progress time t being also zero. It is assumed that the opening 38 moves in leftward direction with a constant velocity v.

In FIG. 11b the opening 38 has moved for a path s and time t with said velocity v. As a result of this movement the free cross-sectional area a has been decreased.

In FIG. 11c the opening 38 has moved for a transition time perod $\Delta T$ through a path $\Delta S$ to the closed position $P_c$ in which the opening 38 and the opening 40 are not further in overlapping relationship. Consequently the free cross-sectional area a corresponds to a closing value $A_c$ which is zero.

The free cross-sectional area a is dependent on time t and is defined by the length l and the height h as shown in FIG. 11b. The length l and the height h of the triangular cross-sectional area a of FIG. 11b are correlated by the equation I $$h = l \cdot tg\alpha \qquad \text{I.}$$

in which $\alpha$ is the slope of the inclined edge line 44 of opening 38.

The cross-sectional area a is defined by the equation II $$a = \tfrac{1}{2} l \cdot h \qquad \text{II.}$$

By combining equations I and equation II one obtains the equation III $$a = \tfrac{1}{2} l^2 tg\alpha. \qquad \text{III.}$$

The length l is as one can see from FIG. 11b obtained according to the equation IV $$l = \Delta S - S. \qquad \text{IV.}$$

In this equation s is again the path of movement of the opening 38 and $\Delta S$ is the total path of movement of the opening 38 between the open position $P_o$ according to FIG. 11a and the closed position $P_c$ according to FIG. 11c.

The total path $\Delta S$ is correlated with the transition time period $\Delta T$ by the equation V $$\Delta S = \Delta T \cdot v. \qquad \text{V.}$$

The path s in an intermediate position according to FIG. 11b is correlated with the corresponding time t by the equation VI $$s = t \cdot v. \qquad \text{VI.}$$

By introducing the equation V and VI into the equation IV one obtains equation VII $$l = \Delta T \cdot v - tv = v \cdot (\Delta T - t). \qquad \text{VII.}$$

By introducing the equation VII into equation III one obtains equation VIII $$a = \frac{1}{2} v^2(\Delta T - t)^2 \cdot tg\alpha \qquad \text{VIII.}$$
$$= \frac{1}{2} v^2 tg\alpha(\Delta T^2 - 2t\Delta T + t^2).$$

By differentiating the equation VIII one obtains the cross-sectional area change function da/dt according to equation IX $$\frac{da}{dt} = \frac{1}{2} v^2 tg\alpha(2t - 2\Delta T) \qquad \text{IX.}$$
$$= v^2 tg\alpha \cdot (t - \Delta T).$$

By inserting t=0 into equation IX one obtains according to equation X the value da/dt at the time t=0, for example, in position $P_o$, $T_o$ $$\text{at } P_o, T_o: \frac{da}{dt} = -v^2 \cdot tg\alpha \cdot \Delta T \qquad \text{X.}$$
$$t = 0.$$

Inserting now into equation IX $\Delta T$ for t one obtains according to equation XI the value of the cross-sectional area change function da/dt in the relative position $P_c$ of the openings 38 and 40 according to FIG. 11c; the value of the cross-sectional area change function da/dt is zero according to equation XI $$\text{at } P_c, T_c: \frac{da}{dt} = 0. \qquad \text{XI.}$$
$$t = \Delta T$$

From equation IX one can further see that when t increases toward $\Delta T$ the cross-sectional area change function da/dt is steadily decreased toward zero according to equation XII $$t \to \Delta T \text{ results in } da/dt \to 0. \qquad \text{XII.}$$

It is easily understandable that the average value of the cross-sectional area change function da/dt during the transition time period $\Delta T$ corresponds according to equation XIII to the quotient of the open value $A_o$ of the by-pass cross-sectional area a in the position $P_o$ according to FIG. 11a and the transition time period $\Delta T$ necessary for movement of the opening 38 between the position $P_o$ of FIG. 11a and the position $P_c$ of FIG. 11c $$\frac{da}{dt} \text{ aver.} = \frac{A_o}{\Delta T}. \qquad \text{XIII.}$$

Comparing now equations XII and XIII one can say according to equation XIV $$\frac{da}{dt} \text{ (at } t = \Delta T) < \frac{da}{dt} \text{ aver.} \qquad \text{XIV.}$$

that the value of the cross-sectional area change function da/dt in dependence of time progress t is—when the valve members are close to the closing value relative position $P_c$ according to FIG. 11c—is considerably smaller than the average value of the cross-sectional area change function.

In FIG. 3 one can again see the opening 40 and the opening 38, the opening 38 being shown both in a position $P_{bc}$ beyond the closing value relative position and in the opening value relative position $P_o$. In the opening value relative position $P_o$ the by-pass cross-sectional area a (narrow hatching) is at a maximum and in the position $P_{bc}$ the by-pass cross-sectional area a is zero.

Figure 3:
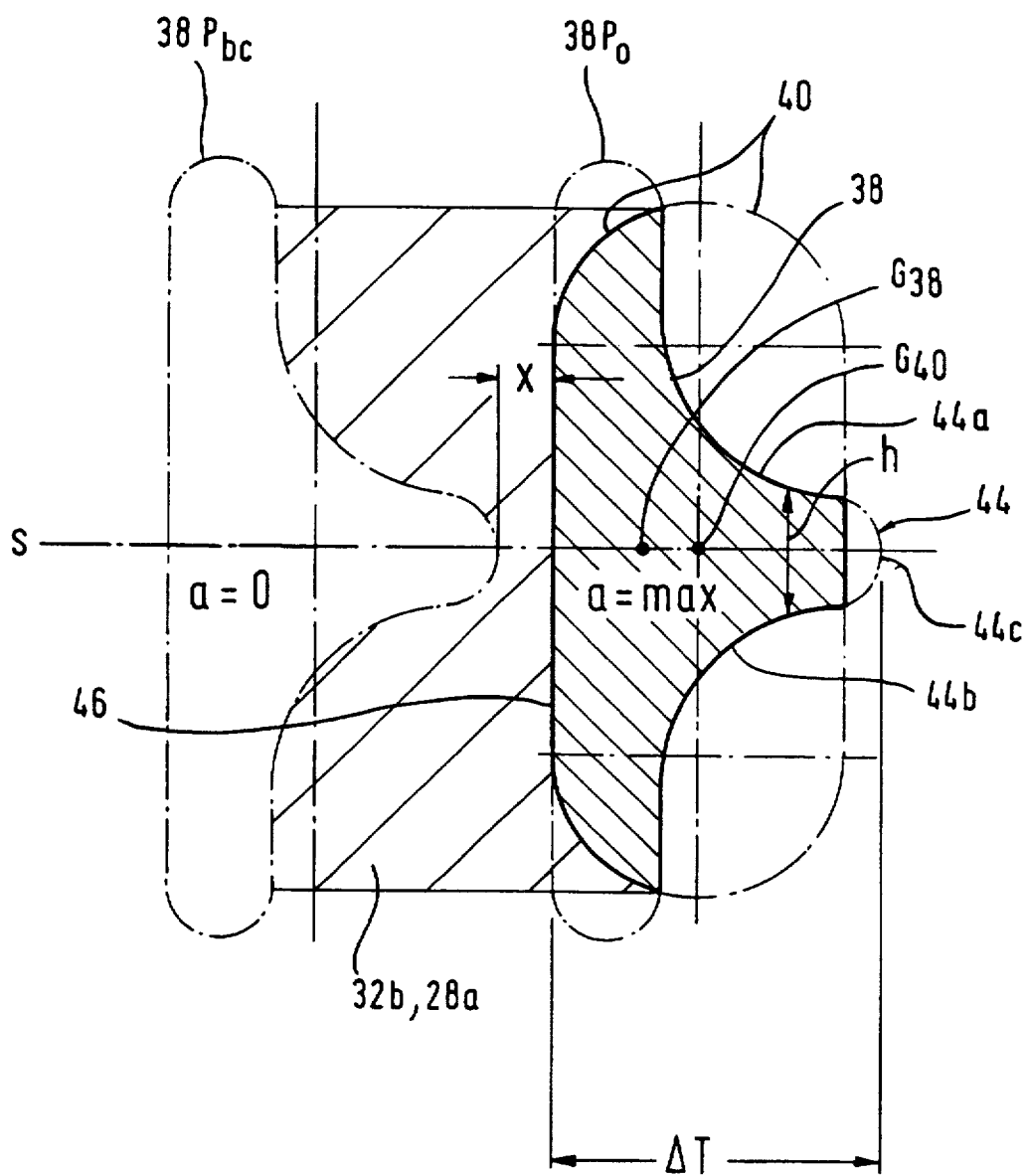
FIG. 3 shows in a developed view the openings of two cooperating valve members.

One can see from FIG. 3 that the by-pass cross-sectional area a is substantially defined by the edge line 44 of the opening 38 and by the edge line 46 of the opening 40. The edge line 46 is a substantially straight line extending orthogonally with respect to a line s of relative movement between the openings 38 and 40. The edge line 44 consists of two substantially hyperbolic edge line sections 44a and 44b and a substantially parabolic edge line section 44c. Assuming now again that the speed of relative movement of the openings 38 and 40 is substantially constant then—as long as the edge line 44 intersects the edge line 46—the value of the cross-sectional area change function da/dt corresponds at any time substantially to the height h of the edge line 44, this height always being measured where the edge line 44 intersects with the edge line 46.

In FIG. 3 one can also recognize the gravity centre $G_{38}$ of the opening 38 and the gravity centre of the opening $G_{40}$. These gravity centres $G_{38}$, $G_{40}$ are in the open value position $P_o$ offset in the direction of the path s of the relative movement of the openings 38 and 40.

One can easily see from FIG. 3 that when the opening 38 moves from the open value position $P_o$ to the closed value position $P_c$ the height h—as measured along the edge line 46—decreases in accordance with a hyperbolical function as long as the edge line sections 44a and 44b are intersecting with the edge line 46. After the edge line 44c has come into an intersecting relationship with the edge line 46 the by-pass cross-sectional area a changes according to a parabolic function.

In FIG. 3 the overlapping area 32b,28a of the contact surfaces 32b and 28a is hatched with large spaces between the hatch lines. This contact area 32b,28a is responsible for the sealing effect in the position $P_{bc}$. It is easily understandable that there is a large overlapping area with a minimum distance of the openings 38 and 40 designated by x. This distance x should have a predetermined minimum value for obtaining a satisfactory sealing effect.

Figure 4:
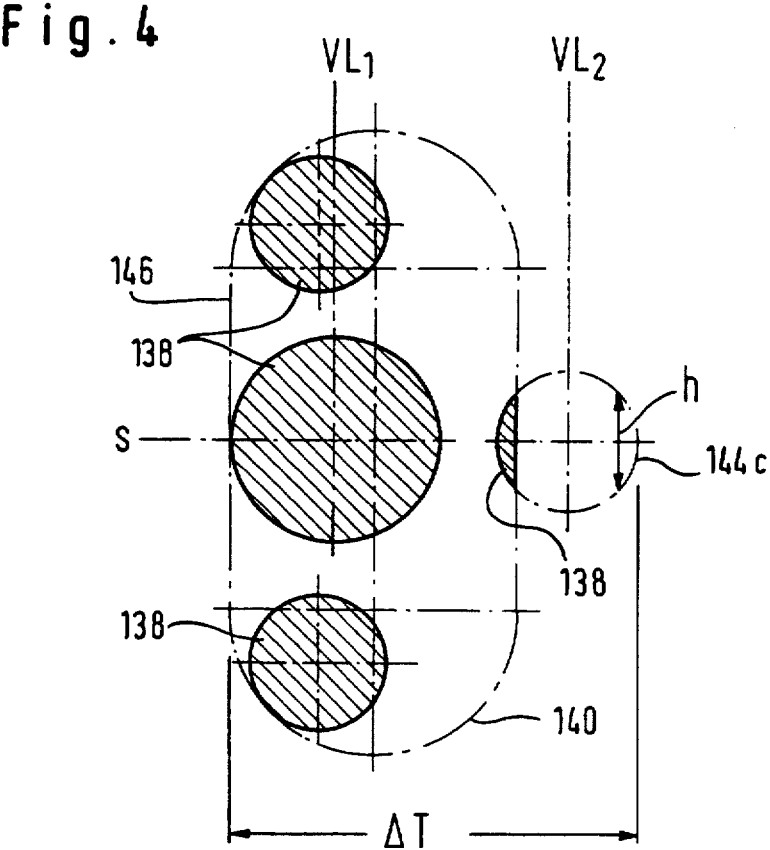
FIGS. 4-9 show further embodiments of cooperating valve members, defining various cross-sectional areas of the by-pass valve unit.

Considering now FIG. 4 one can again recognize the opening 140 which may be provided again within a tube member as shown at 32 in FIG. 1. Moreover, there are shown in FIG. 4 a plurality of circular openings 138 replacing the opening 38 of FIG. 3 which openings 138 may be provided again in a sleeve member such as shown at 32 in FIG. 1. Three of the circular openings 138 are arranged substantially along a vertical line $VL_1$ which is perpendicular to the movement line s. A further circular opening 138 is arranged on a vertical line $VL_2$. The sum of the hatched cross-sectional areas of the circular openings 138 define the by-pass cross-sectional area a. This by-pass cross-sectional area a is reduced when the circular openings 138 are moved to the left with respect to the opening 140. When approaching the closed value position of the by-pass valve unit, the edge line 144c is intersecting with the edge line 146 and the height h is variable again substantially according to a parabolic line. Such it is again true to say that the value of the cross-sectional area change function is—w- hen the valve members are close to the closing value relative position—considerably smaller than the average change of the cross-sectional area during the transition time period.

Figure 5:
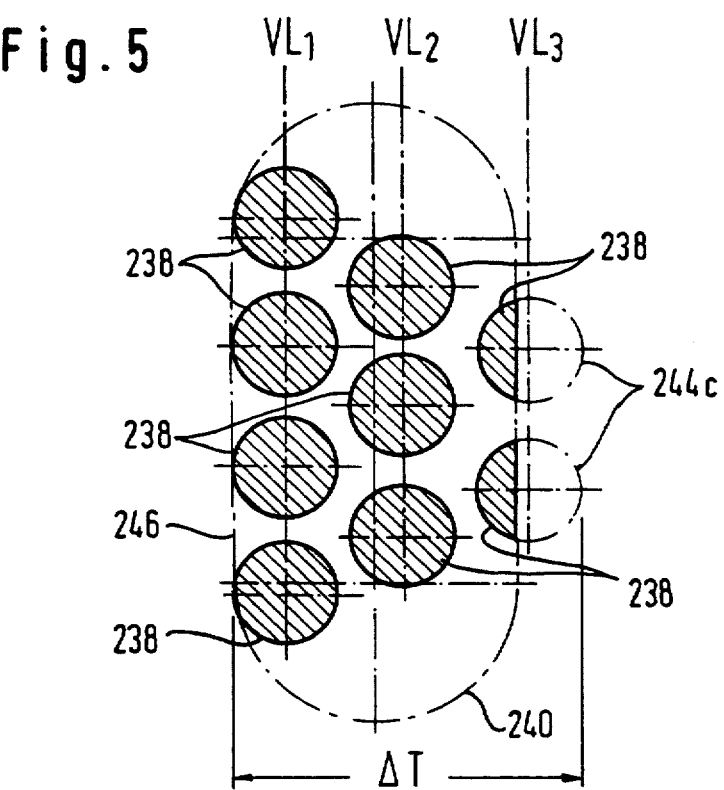

In the embodiment of FIG. 5 the circular openings 238 are distributed along the vertical lines $VL_1, VL_2, VL_3$. One can see again that the value of the cross-sectional area change function is—when the valve members are close to the closing value relative position—considerably smaller than the average change of the by-pass cross-sectional area during the transition time period $\Delta T$.

Figure 6:
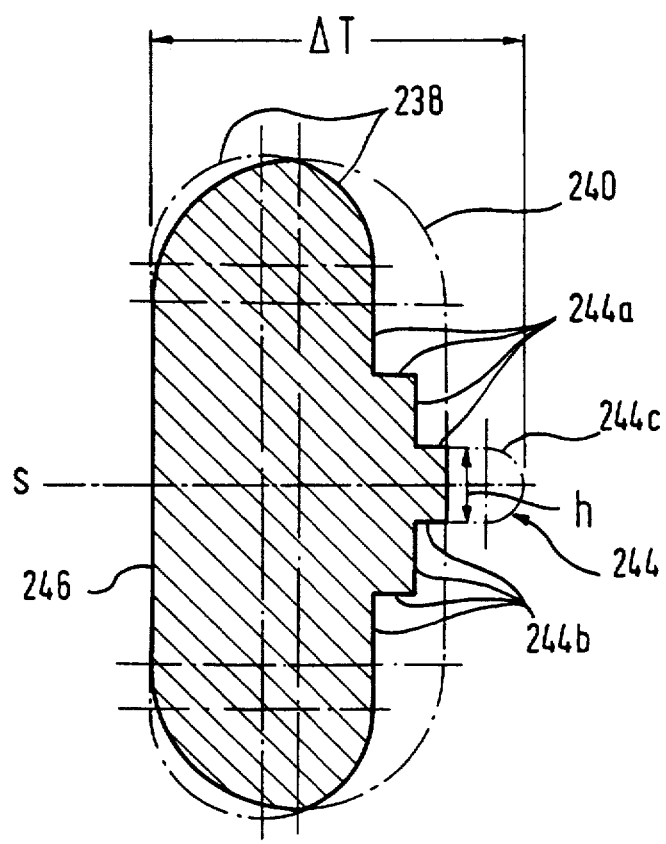

In the embodiment of FIG. 6 the opening 238 has a stepped edge line 244. When the valve members are close to the closing value relative position the edge line 244c of the opening 238 is in intersecting relationship with the edge line 246 of the opening 240. Such the value of the by-pass cross-sectional area follows a stepped cross-sectional area change function which becomes again substantially parabolic when the edge line section 244c comes into intersecting relationship with the edge line 246. Again it is true that the value of the cross-sectional area change function da/dt is—when the valve member are close to the closing value relative position—considerably smaller than the average cross-sectional area change during the transition time period $\Delta T$.

Figure 7:
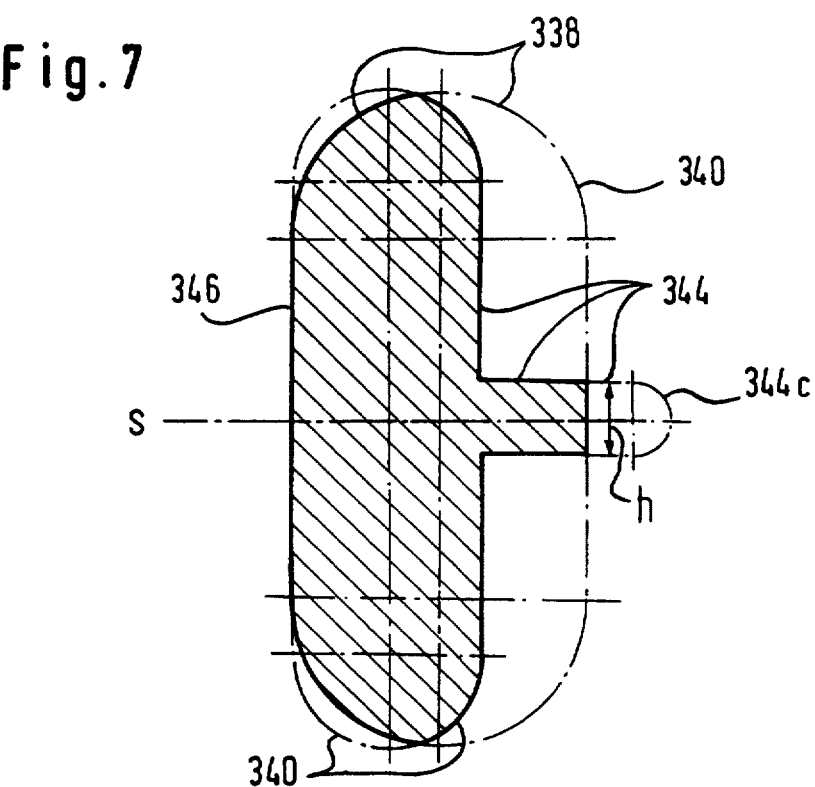

The embodiment of FIG. 7 is very similar to the embodiment of FIG. 6. Analogous elements are designated by the same reference numerals as in FIG. 6. The only difference of FIG. 7 over FIG. 6 is that the edge line 344 has only one step, whereas the edge line of FIG. 6 has two steps. The behaviour of the cross-sectional area change function in dependence of time progress is again similar to said function for the embodiment of FIG. 6.

Figure 8:
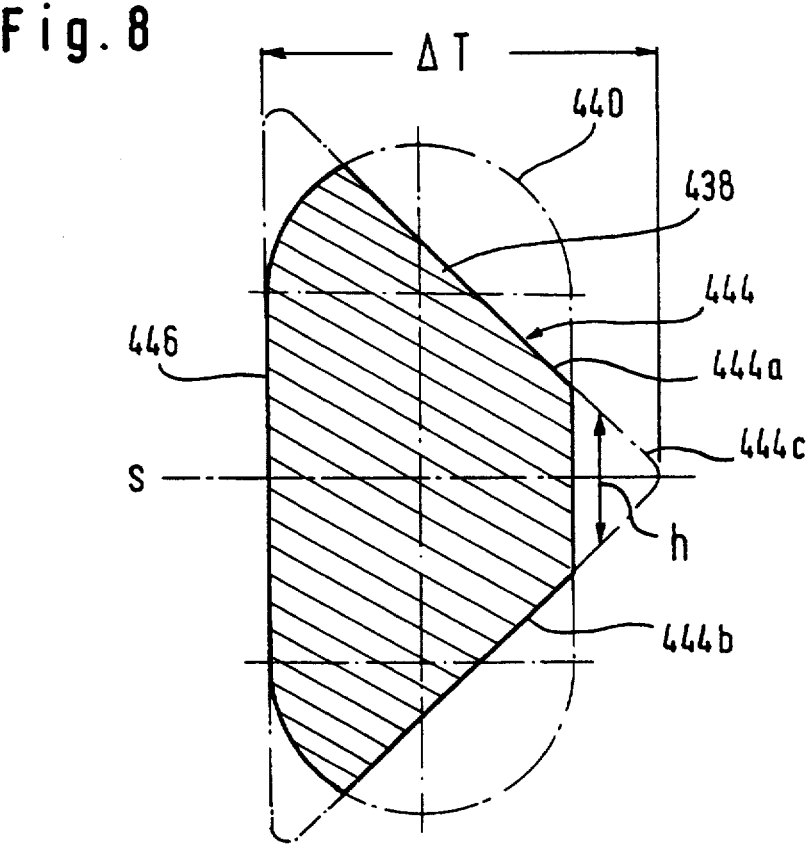

In FIG. 8 there is shown an embodiment which corresponds substantially to the diagrammatic illustration of FIGS. 11a to 11c. It is again easily to be understood that the cross-sectional area change function da/dt represented by h in FIG. 8 is, when the valve members are close to the closing value relative position, i.e., when the edge line section 444c is in intersecting relationship with the edge line 446, considerably smaller than the average change of the by-pass sectional area during the transition time period $\Delta T$. In the embodiment of FIG. 8 the cross-sectional area change function da/dt is substantially a linear function during the total transition time period $\Delta T$.

Figure 9:
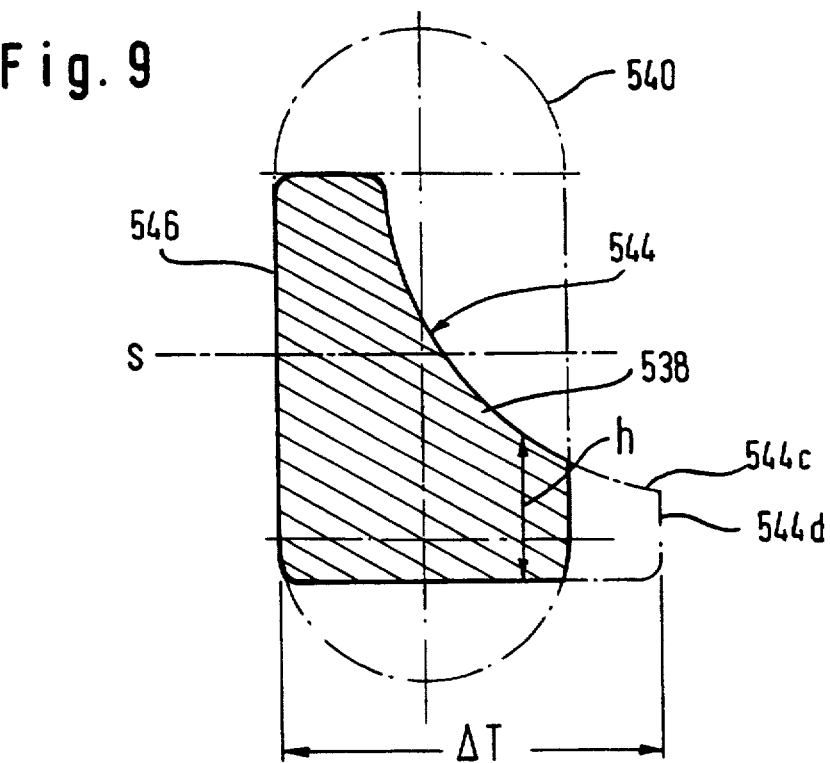

In the embodiment of FIG. 9 the opening 538 has a hyperbolical edge line 544. It is quite clear that the cross-sectional area change function da/dt is, when the valve members are close to the closing value relative position, i.e. when the edge line section 544c is in intersecting relationship with the edge line 546 of the opening 540, considerably smaller than the average change of the cross-sectional area during the transition time period $\Delta T$. One can see from FIG. 9 that the cross-sectional area change function has still a finite value when the edge line section 544d arrives at the edge line 446 of the opening 540.

In all examples of FIGS. 1 to 9 one has started from the assumption that the relative movement velocity of the valve members is constant during the transition time period $\Delta T$.

Figure 10:
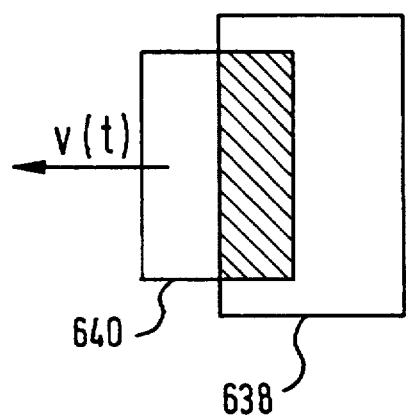
FIG. 10 shows cooperating by-pass valve members for use in connection with an actuating device having a variable speed.

One can obtain a cross-sectional area change function in dependency on transition time progress during the transition time period, the values of which are—when the valve members are close to the closing value relative position—considerably smaller than the average change of the cross-sectional area during the transition time period, also by varying the r.p.m of the electric motor 36 as seen in FIG. 1. It is quite clear that this can be done in reducing the r.p.m. of the electric motor 34 from a larger r.p.m. value in the opening value relative position to a smaller value in the closed value relative position. One can easily understand that such a reduction of the r.p.m. of the motor is possible by a corresponding control program in the control unit of the electric motor which may be located outside the oscillation damper. If such a variable r.p.m of the electric motor is available, one may provide the valve members 28 and 32 of FIG. 1 even with rectangular openings 638 and 640, as shown in FIG. 10.

Figure 12:
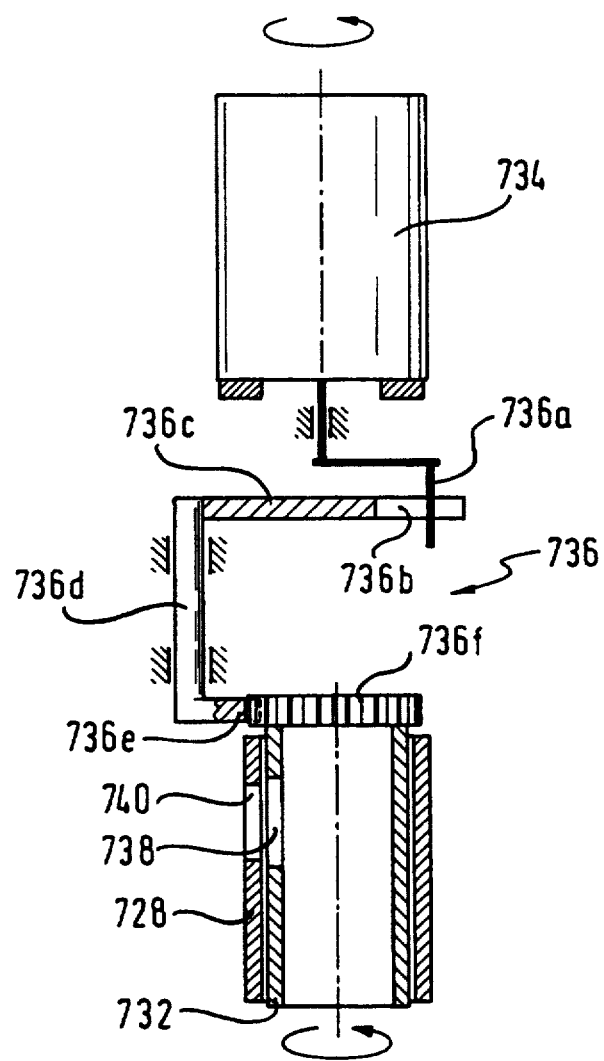
FIG. 12 shows a diagrammatic view of a non-linear gear unit.

In the embodiment of FIG. 12 there is shown an electric motor 734 which rotates with a constant speed. This motor 734 drives the sleeve member 732 through a crank drive mechanism 736. So the opening 738 and 740 may have again the shape of the openings 638 and 640 and, nevertheless, a decreasing cross-sectional area change function da/dt may be obtained due to the decreasing transmission ratio of the crank drive mechanism 736. The crank drive machanism 736 comprises a crank arm 736a eccentric with respect to the shaft of the motor 734. The crank arm 736a engages into a slot 736b of an eccentric rotor member 736c mounted on an eccentric shaft 736d. The eccentric shaft 736d is provided with a teeth segment 736e which meshes with a driving gear 736f of the sleeve member 732. It is easily understandable that the transmission ratio of the crank gear mechanism 736 is dependent on the angular position of the slot 736b about the axis of the shaft 736d. One can design the crank drive mechanism such that substantially a hyperbolic or a parabolic cross-sectional area change function is obtained.

It is also possible to provide a cam drive mechanism which allows any desired function of the change of the cross-sectional area to be obtained.

Returning now to FIG. 1 it is easily to be understood that the angular relative positions of the openings in the by-pass valve units 24 and 26 may be selected such that in response to rotation of the electric motor 34 the various damping characteristics of the oscillation damper are obtained one after the other.

The embodiment of FIG. 8 is very helpful if one wants to obtain a maximum by-pass cross-sectional area in the most open position. The electric motor may be controlled by control pulses of electric current. The control may be obtained by variation of the length and-/or the distance of subsequent control pulses.

It is easily understood that, for example, in the embodiment of FIGS. 1 and 2 each sleeve member 32 may also have a plurality of openings 38, for example, a pair of openings 38, which are located diametrically opposite to each other along a diameter of the sleeve member 32. In such an embodiment the necessary angular movement of the relative movement of the valve members 28 and 32 is about 60°.

It has been found that according to the principles of the present invention the contact face area may be easily increased and this means that the tightness of the by-pass valve units in the closed relative position is also improved. While in FIG. 3 the distance x is relatively small one can recognize that in total the available contact surface area is very large.

The embodiments of FIG. 4 and 5 are well adapted for a variation of the cross-sectional area change function by increasing the number and/or the diameter of the circular openings. In the embodiment of FIGS. 6 and 7 a further variation of the cross-sectional area change function is possible by providing elongate holes in a step-shaped arrangement.

While specific embodiments of the invention have been shown and described in detail to illustrate the application of the inventive principles, it will be understood that the invention may be embodied otherweise without departing from such principles.

We claim:

1. An oscillation damper comprising at least two damper units movable with respect to each other, means defining at least two working chambers with at least one damping valve unit therebetween, a damping fluid within said working chambers, said damping fluid being urged through said at least one damping valve unit in response to relative movement of said damper units with respect to each other, at least one by-pass channel system having at least one by-pass valve unit, said by-pass valve unit having a by-pass cross-sectional area, a, switchable between only two operational values, namely, an open value $A_o$ and a closed value $A_c=0$, the respective value of said by-pass cross-sectional area, a, having an influence on the damping behaviour of said oscillation damper, said by-pass cross-sectional area, a, being switchable by an actuating device moving through movement transmission means at least two valve members of said by-pass valve unit with respect to each other at a relative movement speed v, said valve members confining said by-pass cross-sectional area, a, a transition time period $\Delta T$ corresponding to the relative movement of said valve members between an open value relative position $P_o$ providing said open value $A_o$ of said by-pass cross-sectional area, a, and a closed value relative position $P_c$ providing said closed value $A_c=0$ of said by-pass cross-sectional area, a, the relative movement speed v of said actuating unit, the transmission ratio of said movement transmission means and shaped parts of said valve members defining a cross-sectional area change function da/dt dependent on a transition time progress t during said transition time period $\Delta T$, the respective value of said cross-sectional area change function being variable in dependence of time progress t and being—when said valve members are close to said closed value relative position $P_c$ considerably smaller than the quotient $A_o/\Delta T$, wherein $A_o$ is the open value cross-sectional area and $\Delta T$ is the transition time period.

2. An oscillation damper comprising at least two damper units movable with respect to each other, means defining at least two working chambers with at least one damping valve unit therebetween, a damping fluid within said working chambers said damping fluid being urged through said at least one damping valve unit in response to relative movement of said damper units with respect to each other, at least one by-pass channel system having at least one by-pass valve unit, said by-pass valve unit having a by-pass cross-sectional area, a, variable between an open value $A_o$ and a closed value $A_c$, the respective value of said by-pass cross-sectional area, a, having an influence on the damping behaviour of said oscillation damper, said by-pass cross-sectional area, a, being variable by an actuating device moving through movement transmission means at least two valve members of said by-pass valve unit with respect to each other at a relative movement speed v, said valve members confining said by-pass cross-sectional area, a, a transition time period $\Delta T$ corresponding to the relative movement of said valve members between an open value relative position $P_o$ providing said open value $A_o$ of said by-pass cross-sectional area, a, and a closed value relative position $P_c$ providing said closed value $A_c$ of said by-pass cross-sectional area, a, the relative movement speed v of said actuating unit, the transmission ratio of said movement transmission means and shaped parts of said valve members defining a cross-sectional area change function da/dt dependent on a transition time progress t during said transition time period $\Delta T$, the respective value of said cross-sectional area change function being variable in dependence of time progress t and being—when said valve members are close to said closed value relative position $P_c$—considerably smaller than the quotient $(A_o-A_c)/\Delta T$, wherein $A_o$ is the open value cross-sectional area, $A_c$ is the closed value cross-sectional area and $\Delta T$ is the transition time period, and the value of said cross-sectional area change function da/dt being—within a time interval adjacent the closed value relative position $P_c$, which time interval is smaller than 20% of said transition time period $\Delta T$—smaller than 50% of the value of said function da/dt adjacent the open value relative position $P_o$ of said valve members.

3. An oscillation damper comprising at least two damper units movable with respect to each other, means defining at least two working chambers with at least one damping valve unit therebetween, a damping fluid within said working chambers said damping fluid being urged through said at least one damping valve unit in response to relative movement of said damper units with respect to each other, at least one by-pass channel system having at least one by-pass valve unit, said by-pass valve unit having a by-pass cross-sectional area, a, variable between an open value $A_o$ and a closed value $A_c$, the respective value of said by-pass cross-sectional area, a, having an influence on the damping behaviour of said oscillation damper, said by-pass cross-sectional area, a, being variable by an actuating device moving through movement transmission means at least two valve members of said by-pass valve unit with respect to each other at a relative movement speed v, said valve members confining said by-pass cross-sectional area, a, a transition time period $\Delta T$ corresponding to the relative movement of said valve members between an open value relative position $P_o$ providing said open value $A_o$ of said by-pass cross-sectional area, a, and a closed value relative position $P_c$ providing said closed value $A_c$ of said by-pass cross-sectional area, a, the relative movement speed v of said actuating unit, the transmission ratio of said movement transmission means and shaped parts of said valve members defining a cross-sectional area change function da/dt dependent on a transition time progress t during said transition time period $\Delta T$, the respective value of said cross-sectional area change function being variable in dependence of time progress t and being—when said valve members are close to said closed value relative position $P_c$—considerably smaller than the quotient $(A_o-A_c)/\Delta T$, wherein $A_o$ is the open value cross-sectional area, $A_c$ is the closed value cross-sectional area and $\Delta T$ is the transition time period, and the value of said cross-sectional area change function da/dt being—within a time interval adjacent the closed value relative position $P_c$, which time interval is smaller than 10% of said transition time period $\Delta T$—smaller than 30% of the value of said function da/dt adjacent the open value relative position $P_o$ of said valve members.

4. An oscillation damper comprising at least two damper units movable with respect to each other, means defining at least two working chambers with at least one damping valve unit therebetween, a damping fluid within said working chambers said damping fluid being urged through said at least one damping valve unit in response to relative movement of said damper units with respect to each other, at least one by-pass channel system having at least one by-pass valve unit, said by-pass valve unit having a by-pass cross-sectional area, a, variable between an open value $A_o$ and a closed value $A_c$, the respective value of said by-pass cross-sectional area, a, having an influence on the damping behaviour of said oscillation damper, said by-pass cross-sectional area, a, being variable by an actuating device moving through movement transmission means at least two valve members of said by-pass valve unit with respect to each other at a relative movement speed v, said valve members confining said by-pass cross-sectional area, a, said valve members having respective contact surfaces in surface contact with each other, each of said valve members being provided with at least one respective opening therethrough, said valve members being movable with respect to each other in a direction along a line s of relative movement following said contact surfaces, said openings overlapping each other in said open value relative position $P_o$ of said valve members and being free of overlapping in said closed value relative position $P_c$ of said valve members, said by-pass cross-sectional surface area, a, being in an overlapping condition of said openings confined by at least two edge lines, including a first edge line of an opening of a first one of said valve members and a second edge line of an opening of a second one of said valve members, said first and second edge lines being movable with respect to each other along said line s of relative movement, one of said first and second edge lines being a substantially straight line substantially perpendicular to said line s of relative movement and the other one comprising at least one stepped line section, a transition time period $\Delta T$ corresponding to the relative movement of said valve members between an open value relative position $P_o$ providing said open value $A_o$ of said by-pass cross-sectional area, a, and a closed value relative position $P_c$ providing said closed value $A_c$ of said by-pass cross-sectional area, a, the relative movement speed v of said actuating unit, the transmission ratio of said movement transmission means and shaped parts of said valve members defining a cross-sectional area change function da/dt dependent on a transition time progress t during said transition time period $\Delta T$, the respective value of said cross-sectional area change function being variable in dependence of time progress t and being, when said valve members are close to said closed value relative position $P_c$, considerably smaller than the quotient $(A_o - A_c)/\Delta T$, wherein $A_o$ is the open value cross-sectional area, $A_c$ is the closed value cross-sectional area and $\Delta T$ is the transition time period.

5. An oscillation damper as set forth in any one of claims 1, 3, and 4, said cross-sectional area change function da/dt being the same for both directions of relative movement of said valve members such that the respective values of said cross-sectional area change function da/dt are identical in any relative position of said valve members spaced from the open value relative position $P_o$ by a predetermined time interval irrespective of the direction of relative movement.

6. An oscillation damper as set forth in any one of claims 1, 3 and 4, the value of said cross-sectional area change function da/dt being—within a time interval adjacent the closed value relative position $P_c$, which time interval is smaller than 20% of said transition time period $\Delta T$,—smaller than 50% of the value of said function da/dt adjacent the open value relative position $P_o$ of said valve members.

7. An oscillation damper as set forth in claim 6, the value of said cross-sectional area change function da/dt being—within a time interval adjacent the closed value relative position $P_c$, which time interval is smaller than 20% of said transition time period $\Delta T$,—smaller than 30% of the value of said function da/dt adjacent the open value relative position $P_o$ of said valve members.

8. An oscillation damper as set forth in claim 6, the value of said cross-sectional area change function da/dt being—within a time interval adjacent the closed value relative position $P_c$, which time interval is smaller than 20% of said transition time period $\Delta T$,—smaller than 20% of the value of said function da/dt in the open value relative position $P_o$ of said valve members.

9. An oscillation damper as set forth in either claim 1 or claim 4, the value of said cross-sectional area change function da/dt being—within a time interval adjacent the closed value relative position $P_c$, which time interval is smaller than 10% of said transition time period $\Delta T$,—smaller than 30% of the value of said function da/dt in the open value relative position $P_o$ of said valve members.

10. An oscillation damper as set forth in any one of claims 1, 2, 3, and 4, said cross-sectional area change function da/dt being substantially a hyperbolic function.

11. An oscillation damper as set forth in any one of claims 1, 2, 3, and 4, said cross-sectional area change function da/dt being substantially a parabolic function.

12. An oscillation damper as set forth in any one of claims 1, 2, and 3, said cross-sectional area change function da/dt being substantially a hyperbolic function within a first time interval of said transition time period $\Delta T$ and being substantially a parabolic function within a second time interval of said transition time period $\Delta T$, said first time interval being adjacent said open value relative position $P_o$, said second time interval being adjacent said closed value relative position $P_c$, said first time interval being longer than said second time interval.

13. An oscillation damper as set forth in any one of claims 1, 2, and 3, said variation of said cross-sectional area change function da/dt being substantially a result of a variation of a driving speed of said actuating device in response to transition time progress t.

14. An oscillation damper as set forth in any one of claims 1, 2, and 3, said variation of said cross-sectional are change function da/dt being substantially a result of a variation of the transmission ratio of said movement transmission means in response to transition time progress t.

15. An oscillation damper as set forth in any one of claims 1, 2, and 3, said variation of the cross-sectional area change function da/dt being substantially a result of the shape of at least one of said valve members.

16. An oscillation damper as set forth in claim 15, said relative movement speed v being substantially constant within said transition time period $\Delta T$.

17. An oscillation damper as set forth in claim 15, the transmission ratio of said movement transmission means being substantially constant during said transition time period $\Delta T$.

18. An oscillation damper as set forth in any one of claims 1, 2, and 3, said valve members having respective contact surfaces in surface contact with each other, each of said valve members being provided with at least one respective opening therethrough, said valve members being movable with respect to each other in a direction along a line s of relative movement following said contact surfaces, said openings overlapping each other in said open value relative position $P_o$ of said valve members and being free of overlapping in said closed value relative position $P_c$ of said valve members.

19. An oscillation damper as set forth in claim 18, said openings—when regarded in a direction substantially perpendicular to said contact surfaces in said open value relative position $P_o$—having respective centres of gravity $G_{38}$, $G_{40}$ spaced from each other along said line s of relative movement.

20. An oscillation damper as set forth in claim 18, said by-pass cross-sectional area, a, being in overlapping condition of said openings confined by at least two edge lines, namely a first edge line of an opening of a first one of said valve members and a second edge line of an opening of a second one of said valve members, said first and second edge lines being movable with respect to each other along said line s of relative movement, one of said first and second edge lines being a substantially straight line substantially perpendicular to said line s of relative movement and the other one of said first and second lines comprising a substantially hyperbolic line section.

21. An oscillation damper as set forth in claim 18, said by-pass cross-sectional area, a, being in overlapping condition of said two openings confined by at least two edge lines, namely a first edge line of an opening of a first one of said valve members and a second edge line of an opening of a second one of said valve members, said first and second edge lines being movable with respect to each other along said line s of relative movement, one of said first and second edge lines being a substantially straight line substantially perpendicular to said line s of relative movement and the other one of said first and second lines comprising a substantially parabolic line section.

22. An oscillation damper as set forth in claim 18, said by-pass cross-sectional surface area, a, being in overlapping condition of said two openings confined by at least two edge lines, namely a first edge line of an opening of a first one of said valve members and a second edge line of an opening of a second one of said valve members, said first and second edge lines being movable with respect to each other along said line of relative movement, one of said first and second edge lines being a substantially straight line substantially perpendicular to said line s of relative movement, the other one of said first and second edge lines comprising a substantially straight edge line section defining an angle of less than 90° with said line s of relative movement.

23. An oscillation damper as set forth in claim 18, said by-pass cross-sectional surface area, a, being in overlapping condition of said openings confined by at least two edge lines, namely a first edge line of an opening of a first one of said valve members and a second edge line of an opening of a second one of said valve members, said first and second edge lines being movable with respect to each other along said line s of relative movement, one of said first and second edge lines being a substantially straight line substantially perpendicular to said line s of relative movement and the other one comprising at least one stepped line section.

24. An oscillation damper as set forth in claim 18, one of said valve members comprising a plurality of openings within a field extending both in the direction of said line s of relative movement and in a direction transverse of said line s of relative movement, the number of openings along transverse lines $VL_1$, $VL_2$ transverse to said line s of relative movement being varied along said line s of relative movement.

25. An oscillation damper as set forth in any one of claims 1, 2, 3, and 4, said valve members being rotatable with respect to each other.

26. An oscillation damper as set forth in claim 25, one of said valve members being a tube member stationary with respect to a piston rod unit of said oscillation damper and the other one of said valve members being a sleeve member rotatable with respect to said tube member within an inner bore thereof, both said sleeve member and said tube member being provided with radial openings which define said by-pass cross-sectional area, a, in cooperation.

27. An oscillation damper as set forth in any one of claims 1, 2, 3, and 4, two piston units being provided on a piston rod unit in an axially spaced relationship along said piston rod unit, said piston units being housed within a cavity of a cylinder member and being slidable along an inner surface of said cylinder member, each of said piston units comprising at least one damping valve unit extending substantially axially therethrough, said by-pass channel system comprising an axial channel within said piston rod unit and further comprising three passages between said axial channel and said cavity, one of said passages being provided between said two piston units and respective ones of two further passages being provided on respective sides of each of said piston units, remote from the respective other piston unit, at least two of said three passages being provided with respective by-pass valve units.

28. An oscillation damper as set forth in claim 27, said by-pass valve units being arranged and actuated such that selectively a first one of said piston units or a second one of said piston units or both of said piston units are by-passed or none of said piston units is by-passed.

29. An oscillation damper as set forth in any one of claims 2, 3, and 4, said by-pass cross-sectional area, a, being switchable only to a finite number of values.

30. An oscillation damper as set forth in any one of claims 2, 3, and 4, said by-pass cross-sectional area, a, being switchable only to a fully open value $P_o$ and a closed value $P_c$.

* * * * *